US012518733B2

(12) United States Patent
Wang et al.

(10) Patent No.: US 12,518,733 B2
(45) Date of Patent: Jan. 6, 2026

(54) ACTIVE NOISE CANCELLER DEVICE

(71) Applicant: Honda Motor Co., Ltd., Tokyo (JP)

(72) Inventors: Xun Wang, Saitama (JP); Toshio Inoue, Saitama (JP)

(73) Assignee: Honda Motor Co., Ltd., Tokyo (JP)

(*) Notice: Subject to any disclaimer, the term of this patent is extended or adjusted under 35 U.S.C. 154(b) by 153 days.

(21) Appl. No.: 18/540,876

(22) Filed: Dec. 15, 2023

(65) Prior Publication Data

US 2024/0274116 A1 Aug. 15, 2024

(30) Foreign Application Priority Data

Feb. 13, 2023 (CN) .......................... 202310105975.X

(51) Int. Cl.
*G10K 11/178* (2006.01)
*G10K 11/18* (2006.01)

(52) U.S. Cl.
CPC ...... *G10K 11/18* (2013.01); *G10K 2210/1282* (2013.01); *G10K 2210/3028* (2013.01)

(58) Field of Classification Search
CPC ......... G10K 11/1783; G10K 11/17833; G10K 11/17815; G10K 11/17817; G10K 11/17813; G10K 11/17873; G10K 2210/3022; G10K 2210/3027

See application file for complete search history.

(56) References Cited

U.S. PATENT DOCUMENTS

| | | | | |
|---|---|---|---|---|
| 2020/0043461 | A1* | 2/2020 | Zollner | G10K 11/17881 |
| 2020/0219478 | A1* | 7/2020 | Zafeiropoulos | G10K 11/17873 |
| 2020/0402494 | A1* | 12/2020 | Hayashi | G10K 11/17881 |
| 2024/0071361 | A1* | 2/2024 | Tu | G10K 11/17881 |

FOREIGN PATENT DOCUMENTS

| | | |
|---|---|---|
| JP | H0728474 | 1/1995 |
| JP | 2008239098 | 10/2008 |
| JP | 2023144581 | 10/2023 |

* cited by examiner

*Primary Examiner* — Ping Lee
(74) *Attorney, Agent, or Firm* — JCIPRNET

(57) ABSTRACT

An active noise canceller device includes: a cancellation sound output device, outputting a cancellation sound for a noise; noise microphones, generating noise signals; a control device, controlling the cancellation sound output device based on the noise signals. The control device executes: obtaining noise signals, selecting reference signals corresponding to the noise and an error signal corresponding to an error of the noise and the cancellation sound from the noise signals, generating a correction reference signal, and generating a control signal. The control device includes: a control filter, generating the control signal of the control device; a primary path filter, generating a noise estimation signal from the reference signals; a secondary path filter, generating a cancellation sound estimation signal from the correction reference signal; and a stability judgment part, judging a stability of the cancellation sound from the control filter, the primary path filter, and the secondary path filter.

5 Claims, 6 Drawing Sheets

ACTIVE NOISE CANCELLER DEVICE

CROSS-REFERENCE TO RELATED APPLICATION

This application claims the priority benefit of China application serial no. 202310105975.X, filed on Feb. 13, 2023. The entirety of the above-mentioned patent application is hereby incorporated by reference herein and made a part of this specification.

BACKGROUND

Technical Field

The disclosure relates to an active noise canceller device.

Description of Related Art

In recent years, efforts to provide access to sustainable transportation systems that also take into account vulnerable persons such as the elderly, the disabled, and children among traffic participants have been active. In order to achieve the stated purpose, research and development efforts are made to further improve the safety and convenience of transportation through development related to the habitability of vehicles.

In the prior art, an active noise canceller device is known which reduces noise by causing cancellation sound which are opposite in phase to the noise to interfere with the noise. For example, this active noise canceller device (noise cancellation device) includes a speaker that output cancellation sound, a speed sensor that generates a signal corresponding to the noise, an error microphone that detects the synthetic sound of the noise and the cancellation sound and outputs the synthetic sound signal, an adaptive signal part of the speaker controlled based on the signals from the speed sensor and the error microphone.

Also, in the patent document (Japanese Patent Application Publication No. 2008-239098), the patent document discloses a technology that generates a reference signal according to a rotation frequency of a transmission shaft. The reference signal is processed by an adaptive filter to generate a control signal that causes the speaker to output cancellation sound to offset the noise transmitted from the transmission shaft to the interior of the vehicle. The adaptive filter is updated based on the error signal output by the microphone set in the vehicle and the reference signal generated by correcting the reference signal with a correction value. In the above-mentioned patent document, the transmission characteristics of the cancellation sound between the speaker and the microphone are measured in advance, and the measured transmission characteristics are used as correction values. Thus, if the transmission characteristics change, a large deviation will be present between the transmission characteristics of the correction value and the actual value. In this case, the adaptive filter for controlling will diverge, and noise amplification and abnormal sound may occur.

Here, the discloser proposes an active noise canceller device that tracks changes in the secondary path transmission characteristics in noise control and may maintain the noise reduction effect. However, in addition to controlling changes in transmission characteristics from the speakers to the microphone (secondary path) for in-vehicle environmental control, there are unforeseen conditions such as the air conditioner blowing on the microphone. Thus, it is necessary to further improve the control methods proposed by the discloser and the means of detecting instability.

Thus, in the habitability of the vehicle, if the controlling becomes unstable, there is a risk of noise amplification or abnormal sound. How to judge the stability of the cancellation sound that offsets the noise is an issue.

SUMMARY

The disclosure judges the stability of the cancellation sound that offsets the noise. Furthermore, this contributes to the development of sustainable transportation systems.

Based on the above description, the disclosure proposes a technical means that detects instability status for an active noise canceller system that may track changes in secondary path transmission characteristics and eliminates instability status to provide an active noise canceller device with higher stability.

According to one embodiment of the disclosure, an active noise canceller device is provided. The active noise canceller device comprises: a cancellation sound output device, outputting a cancellation sound for a noise; a plurality of noise microphones, generating a plurality of noise signals based on the noise; and a control device, controlling the cancellation sound output device based on the plurality of noise signals. The control device configured to execute: obtaining the plurality of noise signals output from the plurality of noise microphones, selecting a plurality of reference signals corresponding to the noise and an error signal corresponding to an error of the noise and the cancellation sound from the plurality of noise signals, generating a correction reference signal by removing a component of the cancellation sound from the plurality of reference signals, and generating a control signal for controlling the cancellation sound output device based on the correction reference signal. The control device further comprises: a control filter, configured to generate the control signal of the control device; a primary path filter, configured to generate a noise estimation signal from the plurality of reference signals; a secondary path filter, configured to generate a cancellation sound estimation signal from the correction reference signal; and a stability judgment part, judging a stability of the cancellation sound from the control filter, the primary path filter, and the secondary path filter.

DESCRIPTION OF THE EMBODIMENTS

Figure 1A:
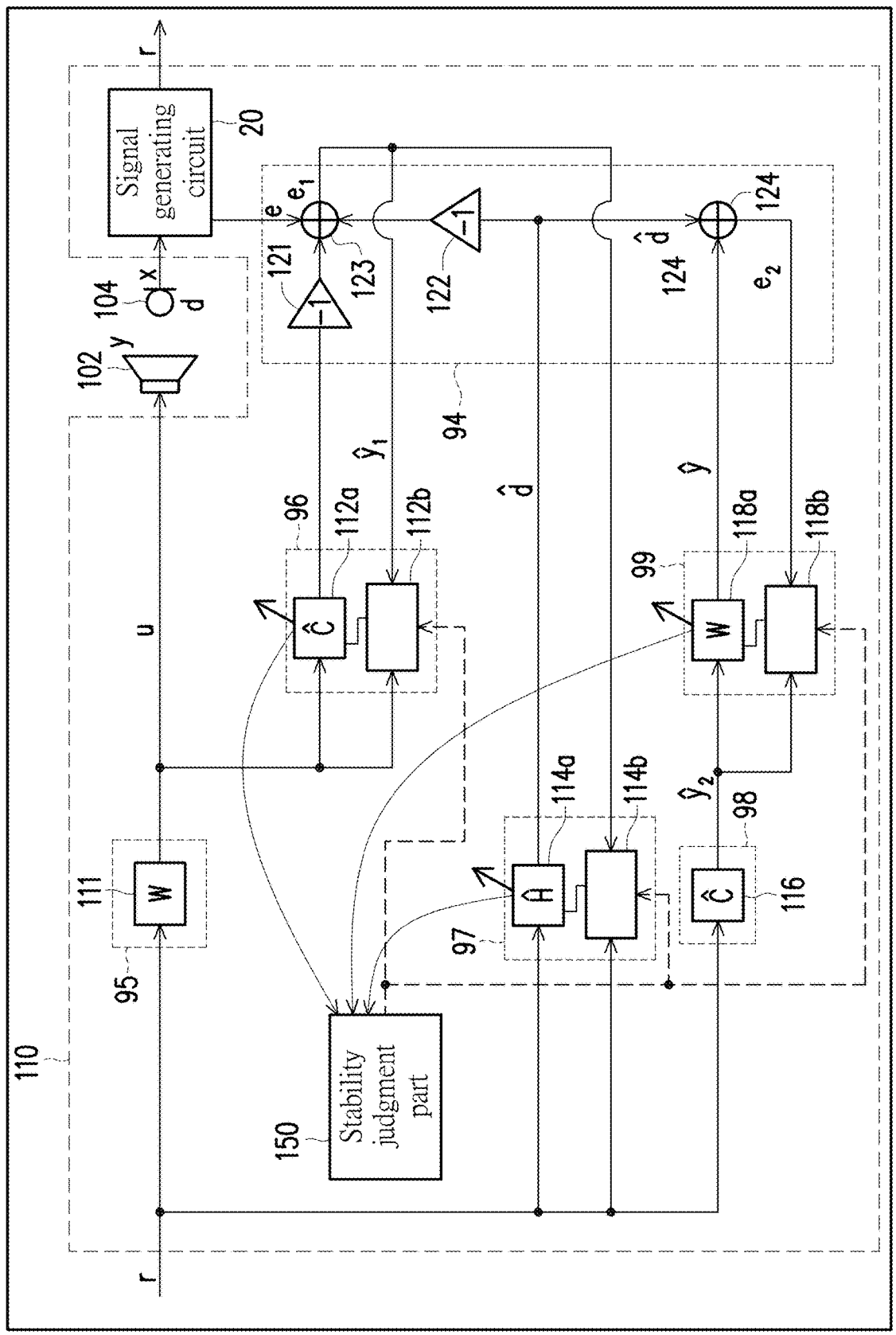
FIG. 1A is a schematic diagram of the configuration of the active noise canceller device according to one embodiment of the disclosure.

References of the exemplary embodiments of the disclosure are to be made in detail. Examples of the exemplary embodiments are illustrated in the drawings. If applicable, the same reference numerals in the drawings and the descriptions indicate the same or similar parts.

FIG. 1A is a schematic diagram of the configuration of the active noise canceller device according to one embodiment of the disclosure. As shown in FIG. 1A, an active noise canceller device 100 is a sound effect control system. The active noise canceller device 100 comprises a cancellation sound output device 102, a plurality of noise microphones 104, and a control device 110. The cancellation sound output device 102 (one cancellation sound output device 102 is exemplarily shown in the drawings), which outputs the cancellation sound for a noise. The noise microphones 104 (one noise microphone 104 is exemplarily shown in the drawings) generate a plurality of noise signals x based on the noise.

Figure 1B:
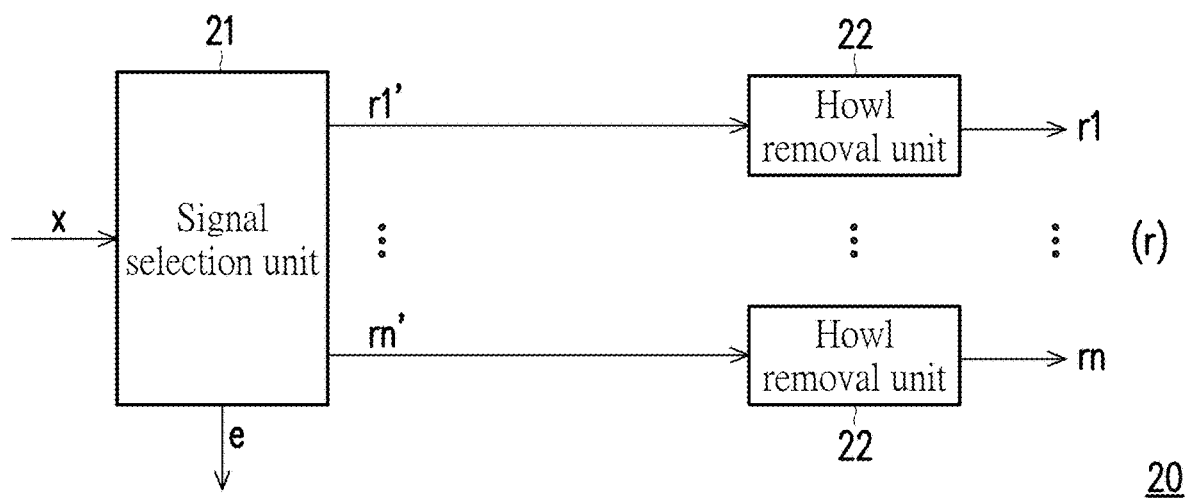
FIG. 1B is a schematic diagram of the configuration of the signal generating circuit according to one embodiment of the disclosure.

The control device 110 controls the cancellation sound output device 102 based on the noise signals x. Specifically, the control device 110 comprises a signal generating circuit 20. As shown in FIG. 1B, the signal generating circuit 20 comprises a signal selection unit 21 and a plurality of howl removal units 22. The signal selection unit 21 obtains the noise signals x output from the noise microphones 104, and selects n pieces of reference signals r1' to rn' corresponding to the noise d and an error signal e corresponding to an error of the noise d and cancellation sound y from the noise signals x. Howl removal units 22 generates a correction reference signal r (r1, . . . , rn) by removing components of the cancellation sound y from the reference signals r1' to rn'. Thus, the control device 110 generates a control signal u for controlling the cancellation sound output device 102 based on the correction reference signal r.

Moreover, the active noise canceller device 100 further comprises a control filter (W), configured to generate the control signal u for controlling the cancellation sound output device 102; a primary path filter (Ĥ), configured to generate a noise estimation signal d̂ from the noise signals x; a secondary path filter (Ĉ), configured to generate a cancellation sound estimation signal ŷ from the correction reference signal r; and a stability judgment part 150, judging a stability of the cancellation sound y from the control filter (W), the primary path filter (Ĥ) and the secondary path filter (Ĉ).

As shown in FIG. 1A, the control device 110 comprises an assumed error signal generation part 94, a control signal output part 95, a first cancellation sound estimation signal generation part 96, a noise estimation signal generation part 97, a second cancellation sound estimation signal generation part 98, and a control filter update part 99.

The control signal output part 95 is defined by a control filter W. The control filter W may be, for example, a finite impulse response (FIR) filter or a SAN filter. The control filter W filters the correction reference signal r to generate the control signal u. The control filter W outputs the generated control signal u to the speaker 102 and the first cancellation sound estimation signal generation part 96.

The first cancellation sound estimation signal generation part 96 comprises a secondary path filter (Ĉ) 112a and a secondary path update part 112b. The secondary path filter (Ĉ) 112a is an estimated value equivalent to the transmission characteristics of the cancellation sound y from the speaker 102 to the error microphone 104. The secondary path filter (Ĉ) may use, for example, a finite impulse response (FIR) filter or a single-frequency adaptive notch (SAN) filter.

The secondary path filter (Ĉ) 112a generates the cancellation sound estimation signal $\hat{y}_1$ by filtering the control signal u. The secondary path filter (Ĉ) 112a outputs the generated cancellation sound estimation signal $\hat{y}_1$ to the assumed error signal generation part 94.

The secondary path update part 112b uses an adaptive algorithm such as the LMS algorithm to adaptively update the coefficient of the secondary path filter (Ĉ) 112a. More specifically, the secondary path update part 112b updates the coefficient of the secondary path filter (Ĉ) 112a, so that the assumed error signal e1 output from the assumed error signal generation part 94 is minimized.

The noise estimation signal generation part 97 comprises a primary path filter (Ĥ) 114a and a primary path update part 114b. The primary path filter (Ĥ) 114a is a filter corresponding to the estimated transmission characteristics of the noise d from the noise source to the error microphone 104. The primary path filter (Ĥ) 114a may use a FIR filter or an SAN filter.

The primary path filter (Ĥ) 114a generates a noise estimation signal d̂ by filtering the correction reference signal r. The primary path filter 114a outputs the generated noise estimation signal d̂ to the assumed error signal generation part 94.

The primary path update part 114b uses an adaptive algorithm such as the LMS algorithm to adaptively update the coefficient of the primary path filter (Ĥ) 114a. More specifically, the primary path update part 114b updates the coefficient of the primary path filter (Ĥ) 114a, so that the assumed error signal e1 output from the assumed error signal generation part 94 is minimized.

The second cancellation sound estimation signal generation part 98 is the same as the first cancellation sound estimation signal generation part 96 and is defined by the secondary path filter (Ĉ) 116. When the coefficient of the secondary path filter (Ĉ) 116 is updated in the first cancellation sound estimation signal generation part 96, the updated coefficient of the secondary path filter (Ĉ) is output to the second cancellation sound estimation signal generation part 98, and the coefficient of the secondary path filter (Ĉ) 116 is updated in the cancellation sound estimation signal generation part 98. That is, the coefficient of the secondary path filter (Ĉ) 116 set in the second cancellation sound estimation signal generation part 98 is not a fixed value, but a value that is sequentially updated based on the signal from the first cancellation sound estimation signal generation part 96.

The secondary path filter (Ĉ) 116 of the second cancellation sound estimation signal generation part 98 filters the correction reference signal r to generate the cancellation sound estimation signal $\hat{y}_2$. The second cancellation sound estimation signal generation part 98 outputs the generated cancellation sound estimation signal $\hat{y}_2$ to the control filter update part 99.

The control filter update part 99 comprises a control filter (W) 118a and a control update part 118b.

The control filter (W) 118a is defined by the control filter (W) similarly to the control signal output part 95. The control filter (W) 118a filters the estimated cancellation sound signal $\hat{y}_2$ output from the second cancellation sound estimation signal generation part 98 and generates the estimated cancellation sound signal ŷ. The control filter (W) 118a outputs the generated cancellation sound estimation signal ŷ to the assumed error signal generation part 94.

The control update part 118b uses an adaptive algorithm such as the LMS algorithm to update the coefficient of the control filter (W) 118a. More specifically, the control update part 118b updates the coefficient of the control filter (W) 118a, so that the assumed error signal e2 output from the assumed error signal generation part 94 is minimized.

When the coefficient of the control filter (W) 118a is updated in the control filter update part 99 in this way, the updated coefficient of the control filter (W) 118a is output to the control signal output part 95, and the control filter (W) 118a is updated. That is, the coefficient of the control filter (W) 118a set in the control signal output part 95 is not a fixed value, but a value that is sequentially updated based on the signal from the control filter update part 99.

The assumed error signal generation part 94 includes a first polarity inversion part 121, a second polarity inversion part 122, a first adder 123, and a second adder 124. The first polarity inversion part 121 inverts the polarity of the cancellation sound estimation signal $\hat{y}_1$ output from the first cancellation sound estimation signal generation part 96. The second polarity inversion part 122 inverts the polarity of the noise estimation signal $\hat{d}$ output from the noise estimation signal generation part 97.

The first adder 123 adds the error signal e, the cancellation sound estimation signal $\hat{y}_1$ passing through the first polarity inversion part 121, and the noise estimation signal $\hat{d}$ passing through the second polarity inversion part 122 to generate the assumed error signal e1. The first adder 123 outputs the generated assumed error signal e1 to the first cancellation sound estimation signal generation part 96 and the noise estimation signal generation part 97.

The second adder 124 adds the noise estimation signal $\hat{d}$ output from the noise estimation signal generation part 97 and the cancellation sound estimation signal y output from the control filter update part 99 to obtain the assumed error signal e2. The second adder 124 outputs the generated assumed error signal e2 to the control update part 118b of the control filter update part 99 to adaptively update the control filter (W) 118a based on the assumed error signal e2 and the cancellation sound signal $\hat{y}_2$.

The control device 110 adaptively updates the coefficient of the secondary path filter ($\hat{C}$) 112a and adaptively updates the control filter (W) 118a based on the coefficient of the updated secondary path filter ($\hat{C}$) 116. As a result, even if the transmission characteristics C of the cancellation sound y from the speaker 102 to the error microphone 104 are changed according to the environmental changes of the error microphone 104, the change is learned and the control filter (W) 111 is updated appropriately. Thus, the noise d may be reduced more effectively.

According to the embodiment of the disclosure, the control device 110 further comprises a stability judgment part 150 that judges the stability of the cancellation sound y by calculating the coefficients of the control filter (W) 111, the primary path filter ($\hat{H}$) 114a, and the secondary path filter ($\hat{C}$) 116.

As described above, in a sound effect control system, there are three filters for controlling the estimated value of the noise transmission path (from the primary path filter ($\hat{H}$)), for controlling the estimated value of the sound transmission path (from the secondary path filter ($\hat{C}$)), and for controlling the control filter W. The noise estimation signal $\hat{d}$ output from the primary path filter ($\hat{H}$) is an estimation of noise of the control point. The convolution result y of the secondary path filter ($\hat{C}$) and the control filter (W) is an estimation of the control sound arriving at the control point.

If the control is successful, the relationship $|\hat{H}|=|\hat{C}||W|$ is established. In this way, $r(|\hat{H}|+|\hat{C}||W|)=0$ is obtained due to the since signal $\hat{d}+\hat{y}=0$. As the control diverges, the control sound becomes louder than the noise, so the relationship between the three filters is $|\hat{H}|<|\hat{C}||W|$. This fact may be used to detect control divergence at an early stage.

For example, the stability judgment part 150 may copy the coefficients of the control filter (W) 111, the primary path filter ($\hat{H}$) 114a, and the secondary path filter ($\hat{C}$) 116, and then calculate these coefficients to judge the stability of the cancellation sound y. This calculation uses, for example, a fast Fourier transform or the amplitude of the filter, etc. The following will describe in detail several methods of judging the stability of the cancellation sound y and the processing methods after the stability judgment.

Figure 2:
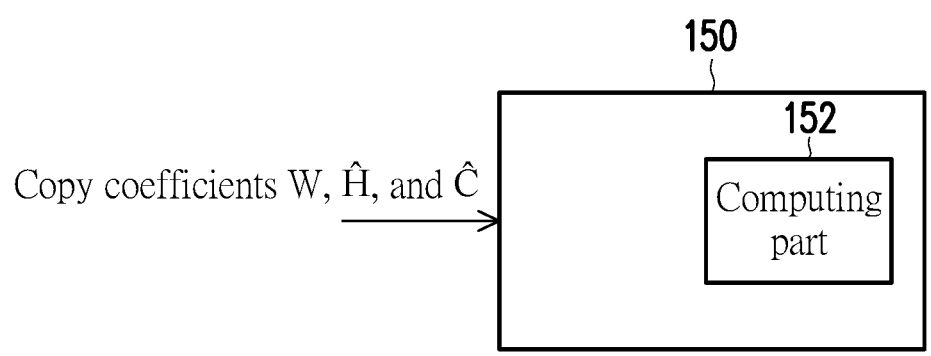
FIG. 2 is a schematic diagram of the stability judgment part according to one embodiment of the disclosure.

FIG. 2 is a schematic diagram of the stability judgment part according to one embodiment of the disclosure. As shown in FIG. 2, the stability judgment part 150 of FIG. 1A comprises a computing part 152. As an example, the computing part 152 may be configured with a circuit configuration or functionality to perform a fast Fourier transform (FFT). The computing part 152 may also calculate the amplitude of each of the aforementioned filters without using the fast Fourier transform (FFT). The operation of the computing part 152 of the stability judgment part 150 will be described in detail below.

Figure 3:
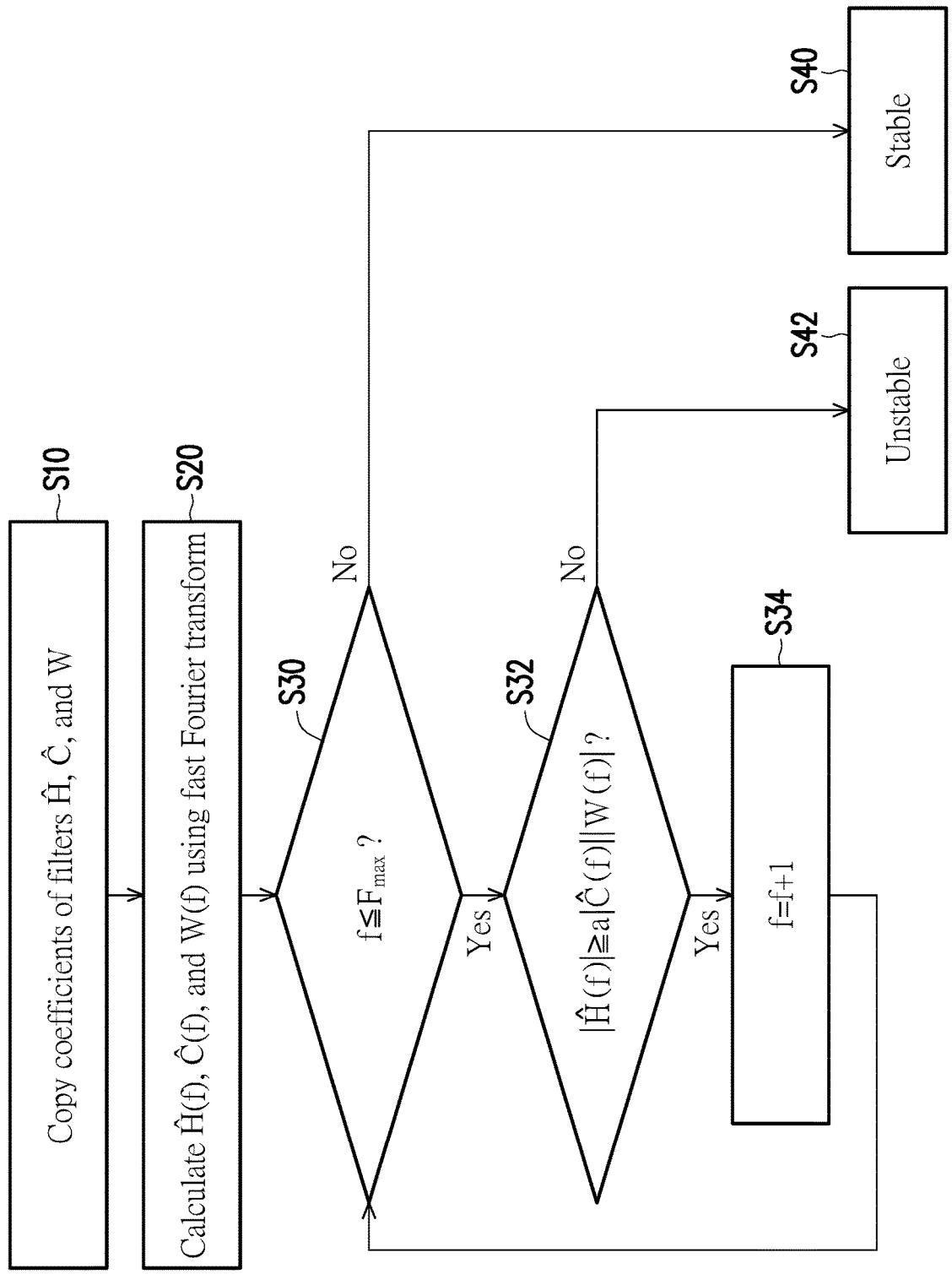
FIG. 3 is a schematic flowchart of the stability judgment according to one embodiment of the disclosure.

FIG. 3 is a schematic flowchart of the stability judgment according to one embodiment of the disclosure. The method shown in FIG. 3 is a method for accurately judging the stability in the frequency domain.

In step S10, the coefficient of the primary path filter ($\hat{H}$) 114a, the coefficient of the secondary path filter ($\hat{C}$) 112a, and the coefficient of the control filter (W) 118a are copied and transmitted to the computing part 152 of the stability judgment part 150.

In step S20, the computing part 152 calculates the frequency components $H(f)=\hat{H}r(f)+j\,\hat{H}i(f)$, $\hat{C}(f)=\hat{C}r(f)+j\,\hat{C}i(f)$, and $W(f)=Wr(f)+j\,Wi(f)$ of the primary path filter ($\hat{H}$) 114a, the secondary path filter ($\hat{C}$) 112a, and the control filter (W) 118a, respectively, using the fast Fourier transform based on the received coefficients of each of the filters. Here, $\hat{H}r(f)$, $\hat{C}r(f)$, and $Wr(f)$ are the real parts of the frequency components $H(f)$, $(f)$, and $W(f)$, respectively, and $\hat{H}i(f)$, $\hat{C}i(f)$, and $Wi(f)$ are the imaginary parts of the frequency components $H(f)$, $(f)$, and $W(f)$, respectively. Through the result of the fast Fourier transform, the amplitudes of the primary path filter ($\hat{H}$) 114a, the secondary path filter ($\hat{C}$) 112a, and the control filter (W) 118a are calculated, respectively. Regarding the calculation of the amplitude, the calculation range is the range between the upper limit (Fmax) and the lower limit of the frequency f of the control object (noise) of the control device 110, and calculation is performed for each of the frequency components (unit frequency), such as 1 Hz.

In step S30, whether the frequency exceeds the upper limit value Fmax is judged. If the frequency exceeds the upper limit value, the cancellation sound y is judged to be stable in step S40. In step S30, when it is judged that the frequency does not exceed the upper limit value Fmax, the judgement on the stability of the cancellation sound y is performed in step S32.

In step 32, the amplitudes of the control filter (W), the primary path filter ($\hat{H}$), and the secondary path filter ($\hat{C}$) are calculated. The respective amplitudes of the control filter (W), the primary path filter ($\hat{H}$), and the secondary path filter ($\hat{C}$) from the lower limit to the upper limit of the frequency are calculated with the following equation (1). In addition, the stability of the cancellation sound y is judged using the following equation (2).

$$\hat{H}(f) = \sqrt{\hat{H}r(f)^2 + \hat{H}i(f)^2} \qquad (1)$$

-continued $$\hat{C}(f) = \sqrt{\hat{C}r(f)^2 + \hat{C}i(f)^2}$$

$$W(f) = \sqrt{Wr(f)^2 + Wi(f)^2} \quad (2)$$

$$|\hat{H}(f)| \geq a \cdot |\hat{C}(f)| \cdot |W(f)|$$

In the above equation, the value of the multiplication of the amplitude of the secondary path filter ($\hat{C}$) and the amplitude of the control filter (W) at each component of the frequency f is the threshold value for judgment. In addition, the adjustment coefficient a may be added to the above judgment equation (1) to adjust the allowable value of the stability judgment. For example, if the adjustment coefficient a is greater than or equal to 1, it may be more allowable to judge the stability of the cancellation sound.

In step S32, if the amplitude of the primary path filter ($\hat{H}$) is greater than the product of threshold value and adjustment coefficient at one component of the frequency f, then the cancellation sound is judged to be unstable (step S42), otherwise, the cancellation sound is judged to be stable. That is, when the amplitude of the primary path filter ($\hat{H}$) is equal to or greater than the product of the threshold value obtained by multiplying the amplitude of the secondary path filter ($\hat{C}$) and the amplitude of the control filter (W) and the adjustment coefficient a, the stability of the cancellation sound is judged to be stable.

In step S32, if the cancellation sound is judged to be stable at the frequency component f, proceed step S34, steadily increase the frequency component f (i.e., f=f+1), and return to step S30 until the frequency component f reaches the upper limit Fmax.

In addition, as may be seen from the above steps S30 to S34, as long as the cancellation sound y is judged to be unstable at one of the frequency components (any one), the cancellation sound y may be judged to be unstable. That is, at any amplitude from the lower limit to the upper limit of the frequency, when the coefficient of the primary path filter ($\hat{H}$) is less than the threshold value, the stability of the cancellation sound y is judged to be unstable.

According to the judgment method shown in FIG. 3, the instability of the cancellation sound may be accurately detected at an early stage.

Figure 4:
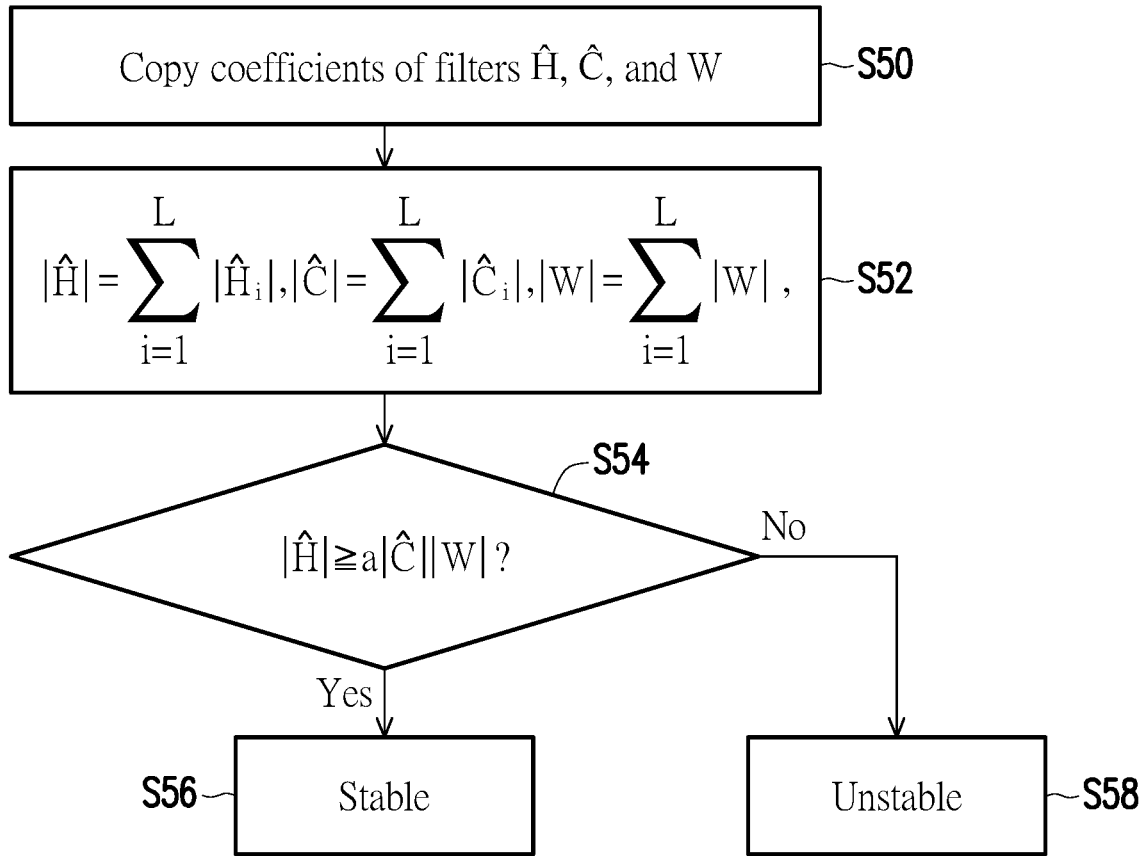
FIG. 4 is a schematic flowchart of the stability judgment according to another embodiment of the disclosure.

FIG. 4 is a schematic flowchart of the stability judgment according to another embodiment of the disclosure. The method shown in FIG. 4 is a method for judging stability in the time domain. The sizes of the control filter (W), the primary path filter ($\hat{H}$), and the secondary path filter ($\hat{C}$) may be represented by the sum of the absolute values of each of the coefficients of the filters. Thus, using these characteristics, the stability of the cancellation sound y may be judged by calculating the sum of the absolute values of the coefficients of the filters.

In step S50, the coefficient of the primary path filter ($\hat{H}$), the coefficient of the secondary path filter ($\hat{C}$) and the coefficient of the control filter (W) are copied and transmitted to the computing part 152 of the stability judgment part 150. This step is basically the same as step S10 shown in FIG. 3.

In step S52, the computing part 152 calculates the coefficient of the control filter (W), the coefficient of the primary path filter ($\hat{H}$), and the coefficient of the secondary path filter ($\hat{C}$), while the sum $|\hat{H}|$ is calculated from the absolute value of the coefficient of the primary path filter ($\hat{H}$), the sum $|\hat{C}|$ is calculated from the absolute value of the coefficient of the secondary path filter ($\hat{C}$), and the sum $|W|$ is calculated from the absolute value of the coefficient of the control filter (W), as shown in the following equations (3) to (5). Here, LH, LC, and LW are the number of coefficients of the primary path filter ($\hat{H}$), the secondary path filter ($\hat{C}$), and the control filter (W), respectively.

$$|\hat{H}| = \sum_{i=1}^{L_H} |\hat{H}_i| \quad (3)$$

$$|\hat{C}| = \sum_{i=1}^{L_C} |\hat{C}_i| \quad (4)$$

$$|W| = \sum_{i=1}^{L_W} |\hat{W}_i| \quad (5)$$

In step S54, the absolute value of the coefficient of the primary path filter ($\hat{H}$) is summed to find the sum $|\hat{H}|$ as the first sum $|\hat{H}|$, and the absolute value of the coefficient of the control filter (W) and the absolute value of the coefficient of the secondary path filter ($\hat{C}$) are multiplied and summed to obtain the second sum $|\hat{C}| \cdot |W|$. Then, the stability of the cancellation sound is judged by using the following equation (6) as the judgment equation (5).

$$|\hat{H}| \geq a \cdot |\hat{C}| \cdot |W| \quad (6)$$

In step S54, according to the above equation (6), when the first sum $|\hat{H}|$ is equal to or greater than the second sum $|\hat{C}| \cdot |W|$, or equal to or greater than the product $a \cdot |\hat{C}| \cdot |W|$ of the second sum $|\hat{C}| \cdot |W|$ and adjustment coefficient a, the cancellation sound y is judged to be stable in step S56. Otherwise, the cancellation sound y is judged to be unstable in step S58. In addition, the adjustment coefficient a may be added to the above judgment equation (6) to adjust the allowable value of the stability judgment. For example, if the adjustment coefficient a is greater than or equal to 1, it may be more allowable to judge the stability of the cancellation sound.

In the judgment method shown in FIG. 3, since the fast Fourier transform (FFT) is used, the calculation amount is large. In comparison, in the judgment method shown in FIG. 4, the calculation amount in the time domain may be relatively reduced a lot, so the calculation load of the stability judgment part 150 may be reduced.

Figure 5:
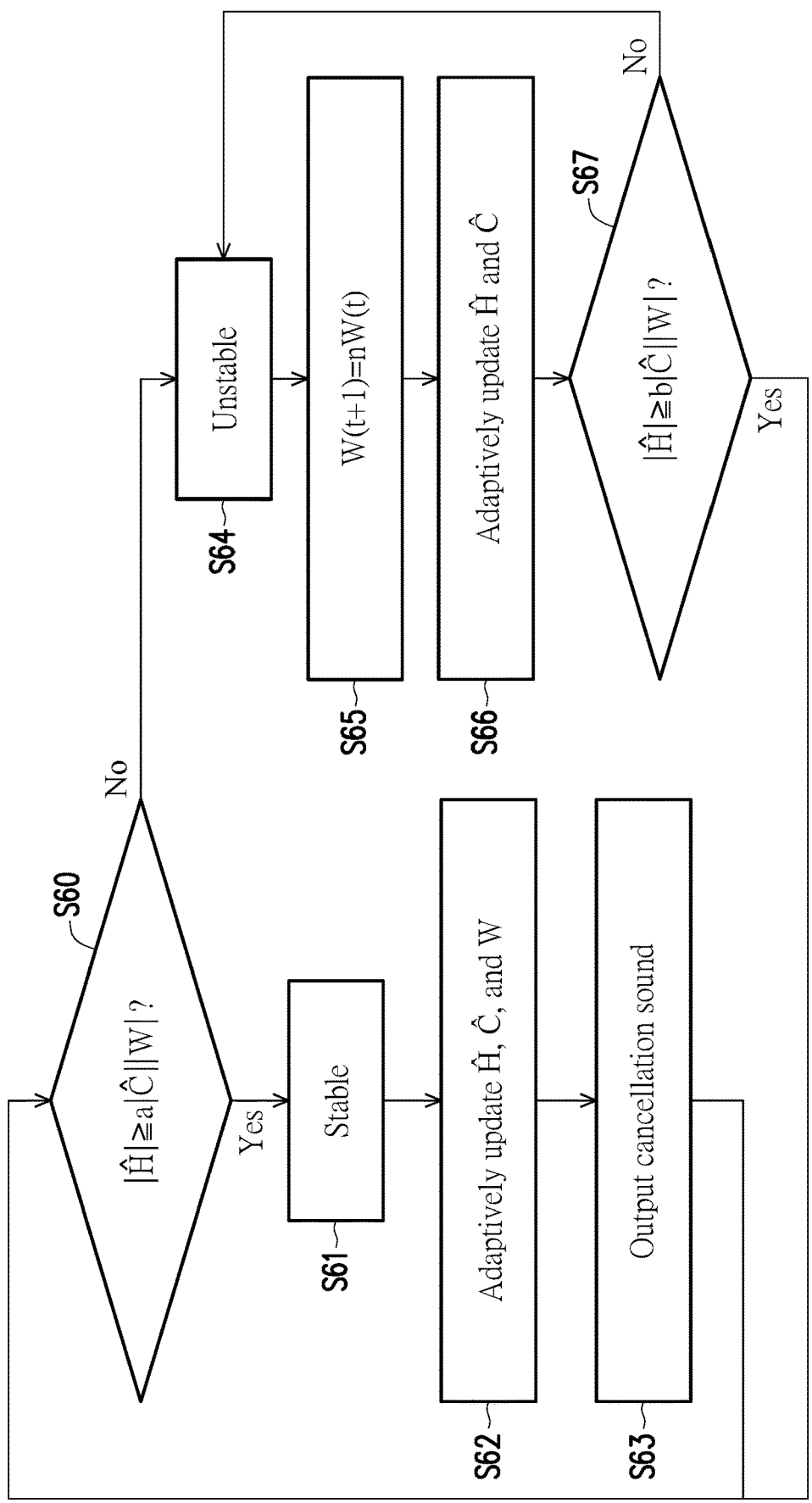
FIG. 5 shows a processing method after the stability judgment according to another embodiment of the disclosure.

FIG. 5 shows a processing method after the stability judgment according to another embodiment of the disclosure.

As shown in FIG. 5, in step S60, the stability of the cancellation sound y is judged. This judgment method may adopt the judgment equation (2) shown in FIG. 3 or the judgment equation (6) shown in FIG. 4. If it is judged in step S60 that the judgment equation (2) or (6) is satisfied, then it is judged in step S61 that the stability of the cancellation sound y is stable.

Next, in step S62, the coefficients of the control filter (W) 118a, the primary path filter ($\hat{H}$) 114a, and the secondary path filter ($\hat{C}$) 112a are passed through the control update part 118b, the primary path update part 114b, and the secondary path update part 112b to perform adaptive updates. In step S63, based on the updated coefficients, the control signal u is output, and the cancellation sound y is output.

Otherwise, if it is judged in step S60 that the judgment equation (2) or (6) is not satisfied, then it is judged in step S64 that the stability of the cancellation sound y is unstable.

Next, in step S65, the control filter (W) is multiplied by the attenuation coefficient η, and W(t+1)=η·W(t), where t is the discrete time. Moreover, in step S66, the coefficients of the primary path filter (Ĥ) 114a and the secondary path filter (Ĉ) 112a are adaptively updated through the primary path update part 114b and the secondary path update part 112b, respectively.

After that, in step S67, the stability of the cancellation sound y is judged under a more stringent condition using the following judgment equation (7). Certainly, the following judgment equation (7) may also be adjusted based on the above judgment equation (1).

$$|\hat{H}| \geqq b \cdot |\hat{C}| \cdot |W| \qquad (7)$$

Here, the coefficient (ratio) b is set larger than the ratio a of the judgment condition when stable, thus, the amplitude of the primary path filter (Ĥ) is required to have a larger allowable value to the product of the amplitudes of the secondary path filter (Ĉ) and the control filter (W) than when stable. Thus, even under this more stringent condition, under the stable condition, the control may return to the normal stable status.

That is, based on the updated results of the primary path filter (Ĥ), the secondary path filter (Ĉ), and the control filter (W), the amplitudes of the primary path filter (Ĥ), the secondary path filter (Ĉ), and the control filter (W) are calculated. The amplitude of the primary path filter (Ĥ) is equal to or greater than the threshold value obtained by multiplying the secondary path filter (Ĉ) and the control filter (W), and when the ratio (b) of the amplitude of the primary path filter (Ĥ) of the attenuation coefficient to the threshold value is greater than the ratio (a) when stable, the stability of the cancellation sound y is judged to be stable.

Thus, the primary path filter (Ĥ) and the secondary path filter (Ĉ) of the acoustic characteristics may be continuously learned while reducing the coefficient of the control filter (W). For the result of the learned control filter (W), primary path filter (Ĥ), and secondary path filter (Ĉ)W, the stability of the cancellation sound is judged with more stringent conditions, so the discomfort caused by frequent switching between stable and instability status may be prevented.

According to the above embodiments, the disclosure may provide an active noise canceller device with higher stability. This active noise canceller device may detect unstable status accurately at an early stage, and may eliminate the unstable status without producing an unpleasant sound.

Other Configurations

According to one embodiment of the disclosure, an active noise canceller device is provided, which includes: a cancellation sound output device, outputting a cancellation sound for a noise; a plurality of noise microphones, generating a plurality of noise signals based on the noise; and a control device, controlling the cancellation sound output device based on the plurality of noise signals. The control device further includes: obtaining the plurality of noise signals output from the plurality of noise microphones, selecting a plurality of reference signals corresponding to the noise and an error signal corresponding to an error of the noise and the cancellation sound from the noise signals, generating a correction reference signal by removing a component of the cancellation sound from the plurality of reference signals, and generating a control signal for controlling the cancellation sound output device based on the correction reference signal. The control device further comprises: a control filter, configured to generate the control signal of the control device; a primary path filter, configured to generate a noise estimation signal from the plurality of reference signals; a secondary path filter, configured to generate a cancellation sound estimation signal from the correction reference signal; and a stability judgment part, judging a stability of the cancellation sound from the control filter, the primary path filter, and the secondary path filter.

According to one embodiment of the disclosure, in the active noise canceller device, the stability judgment part comprises a computing part that performs a fast Fourier transform. The computing part performs the fast Fourier transform on a coefficient of the control filter, a coefficient of the primary path filter, and a coefficient of the secondary path filter to calculate frequency components respectively. In addition, an amplitude of each of the frequency components of the control filter, the primary path filter, and the secondary path filter is calculated from a lower limit to an upper limit of a frequency of the noise determined by the control device. In each of the frequency components of the control filter, the primary path filter, and the secondary path filter from the lower limit to the upper limit of the frequency, the stability of the cancellation sound is judged to be stable when the amplitude of the primary path filter being equal to or greater than a product of a threshold value and an adjustment coefficient, wherein the threshold value is obtained by multiplying the amplitude of the secondary path filter and the amplitude of the control filter, and the adjustment coefficient is greater than or equal to 1. The stability of the cancellation sound is judged to be unstable when the amplitude of the primary path filter in any one of the frequency components from the lower limit to the upper limit of the frequency is less than the threshold value.

According to one embodiment of the disclosure, in the active noise canceller device, the stability judgment part comprises a computing part. The computing part is configured to calculate a coefficient of the control filter, a coefficient of the primary path filter, and a coefficient of the secondary path filter. A first sum is obtained by summing an absolute value of the coefficient of the primary path filter, and a second sum is obtained by summing a multiplication of an absolute value of the coefficient of the control filter and an absolute value of the coefficient of the secondary path filter. The stability of the cancellation sound is judged to be stable when the first sum being equal to or greater than the second sum. The stability of the cancellation sound is judged to be unstable when the first sum is less than the second sum.

According to one embodiment of the disclosure, in the active noise canceller device, when the stability judgment part judges that the stability of the cancellation sound is unstable, the control filter is multiplied by an attenuation coefficient that attenuates the control filter, and the primary path filter and the secondary path filter are adaptively updated. The amplitudes of the primary path filter, the secondary path filter, and the control filter are calculated according to updated results of the primary path filter, the secondary path filter, and the control filter. When an amplitude of the primary path filter being equal to or greater than a threshold value obtained by multiplying an amplitude of the secondary path filter and an amplitude of the control filter and a ratio of the amplitude of the primary path filter to the threshold value is greater than a ratio when stable, the stability of the cancellation sound is judged to be stable.

According to the above embodiment, the disclosure may provide an active noise canceller device with higher stability. This active noise canceller device may detect unstable status accurately at an early stage, and may eliminate the unstable status without producing an unpleasant sound.

Finally, it should be noted that the foregoing embodiments are only used to illustrate the technical solutions of the disclosure, but not to limit the disclosure; although the disclosure has been described in detail with reference to the foregoing embodiments, persons of ordinary skill in the art should understand that the technical solutions described in the foregoing embodiments can still be modified, or parts or all of the technical features thereof can be equivalently replaced; however, these modifications or substitutions do not deviate the essence of the corresponding technical solutions from the scope of the technical solutions of the embodiments of the disclosure.

What is claimed is:

1. An active noise canceller device, comprising:
    a cancellation sound output device, outputting a cancellation sound for a noise;
    a plurality of noise microphones, generating a plurality of noise signals based on the noise;
    a control device, controlling the cancellation sound output device based on the plurality of noise signals,
    wherein the control device is configured to execute:
    obtaining the plurality of noise signals output from the plurality of noise microphones,
    selecting, from the plurality of noise signals, a plurality of reference signals corresponding to the noise and an error signal corresponding to an error of the noise and the cancellation sound,
    generating a correction reference signal by removing a component of the cancellation sound from the plurality of reference signals, and
    generating a control signal for controlling the cancellation sound output device based on the correction reference signal,
    wherein the control device further comprises:
    a control filter, configured to generate the control signal of the control device;
    a primary path filter, configured to generate a noise estimation signal from the plurality of reference signals;
    a secondary path filter, configured to generate a cancellation sound estimation signal from the correction reference signal; and
    a stability judgment part, judging a stability of the cancellation sound from the control filter, the primary path filter, and the secondary path filter.

2. The active noise canceller device according to claim 1, wherein
    the stability judgment part comprises a computing part that is configured to perform a fast Fourier transform,
    the computing part is configured to perform the fast Fourier transform on a coefficient of the control filter, a coefficient of the primary path filter, and a coefficient of the secondary path filter to calculate frequency components respectively,
    an amplitude of each of the frequency components of the control filter, the primary path filter, and the secondary path filter is calculated from a lower limit to an upper limit of a frequency of the noise determined by the control device,
    in each of the frequency components of the control filter, the primary path filter, and the secondary path filter from the lower limit to the upper limit of the frequency, the stability of the cancellation sound is judged to be stable when the amplitude of the primary path filter is equal to or greater than a product of a threshold value and an adjustment coefficient, wherein the threshold value is obtained by multiplying the amplitude of the secondary path filter and the amplitude of the control filter, and the adjustment coefficient is greater than or equal to 1, and
    the stability of the cancellation sound is judged to be unstable when the amplitude of the primary path filter in any one of the frequency components from the lower limit to the upper limit of the frequency is less than the threshold value.

3. The active noise canceller device according to claim 1, wherein
    the stability judgment part comprises a computing part,
    the computing part is configured to calculate a coefficient of the control filter, a coefficient of the primary path filter, and a coefficient of the secondary path filter,
    a first sum is obtained by summing an absolute value of the coefficient of the primary path filter,
    a second sum is obtained by summing a multiplication of an absolute value of the coefficient of the control filter and an absolute value of the coefficient of the secondary path filter,
    the stability of the cancellation sound is judged to be stable when the first sum is equal to or greater than a product of the second sum and an adjustment coefficient, wherein the adjustment coefficient is greater than or equal to 1, and
    the stability of the cancellation sound is judged to be unstable when the first sum is less than the second sum.

4. The active noise canceller device according to claim 2, wherein
    when the stability judgment part judges that the stability of the cancellation sound is unstable, the control filter is multiplied by an attenuation coefficient that attenuates the control filter, and the primary path filter and the secondary path filter are adaptively updated,
    amplitudes of the primary path filter, the secondary path filter, and the control filter are calculated according to updated results of the primary path filter, the secondary path filter, and the control filter, and
    when an amplitude of the primary path filter is equal to or greater than a threshold value obtained by multiplying an amplitude of the secondary path filter and an amplitude of the control filter and a ratio of the amplitude of the primary path filter to the threshold value is greater than a ratio when stable, the stability of the cancellation sound is judged to be stable.

5. The active noise canceller device according to claim 3, wherein
    when the stability judgment part judges that the stability of the cancellation sound is unstable, the control filter is multiplied by an attenuation coefficient that attenuates the control filter, and the primary path filter and the secondary path filter are adaptively updated,
    amplitudes of the primary path filter, the secondary path filter, and the control filter are calculated according to updated results of the primary path filter, the secondary path filter, and the control filter, and
    when an amplitude of the primary path filter is equal to or greater than a threshold value obtained by multiplying an amplitude of the secondary path filter and an amplitude of the control filter and a ratio of the amplitude of the primary path filter to the threshold value is greater than a ratio when stable, the stability of the cancellation sound is judged to be stable.

* * * * *